July 24, 1962
C. W. VOGT
3,045,717
METHOD AND APPARATUS FOR PREPARING
MEASURED CHARGES OF MATERIAL AND
DISPENSING THEM INTO CAVITIES
Filed Aug. 29, 1958
3 Sheets-Sheet 1
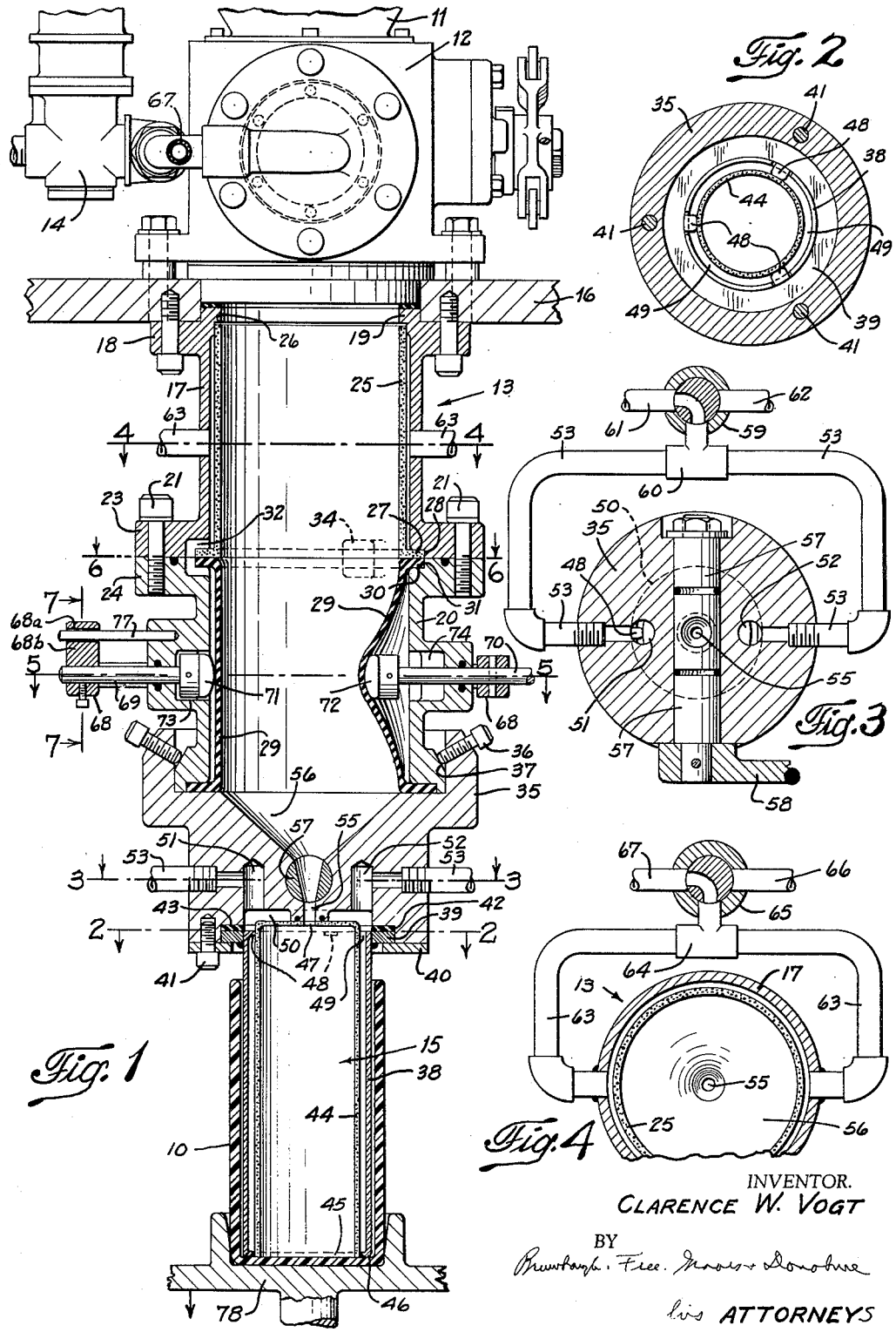
INVENTOR.
CLARENCE W. VOGT
BY
his ATTORNEYS

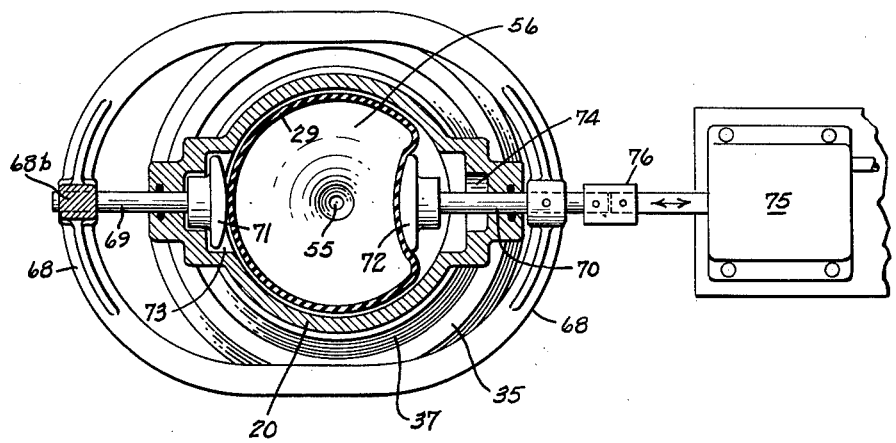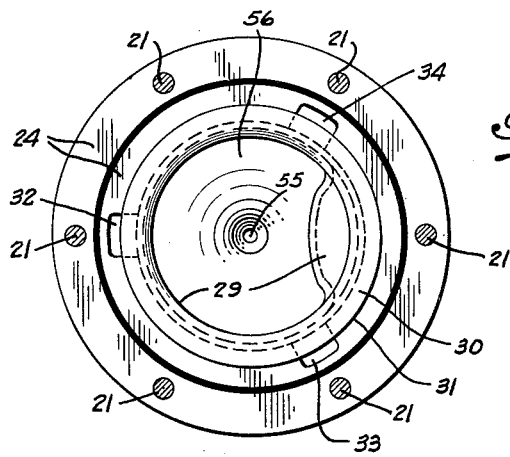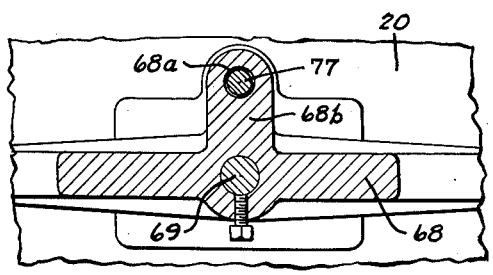

July 24, 1962
C. W. VOGT
3,045,717
METHOD AND APPARATUS FOR PREPARING
MEASURED CHARGES OF MATERIAL AND
DISPENSING THEM INTO CAVITIES
Filed Aug. 29, 1958
3 Sheets-Sheet 3
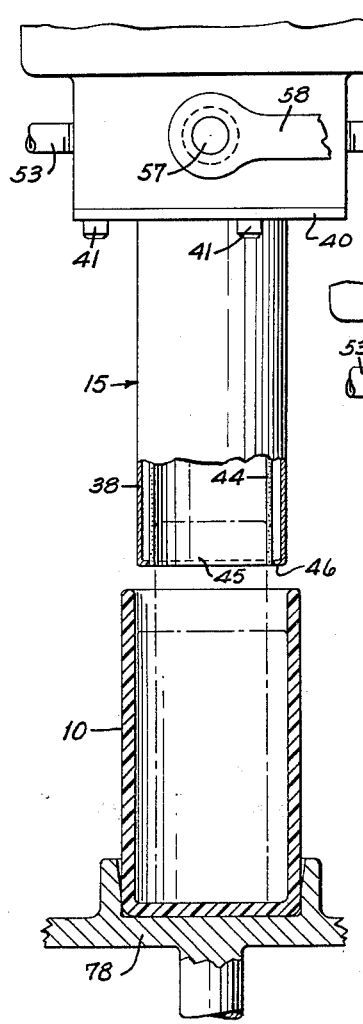
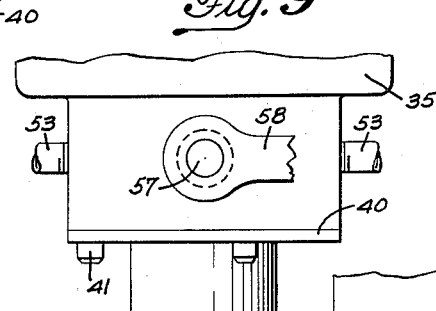
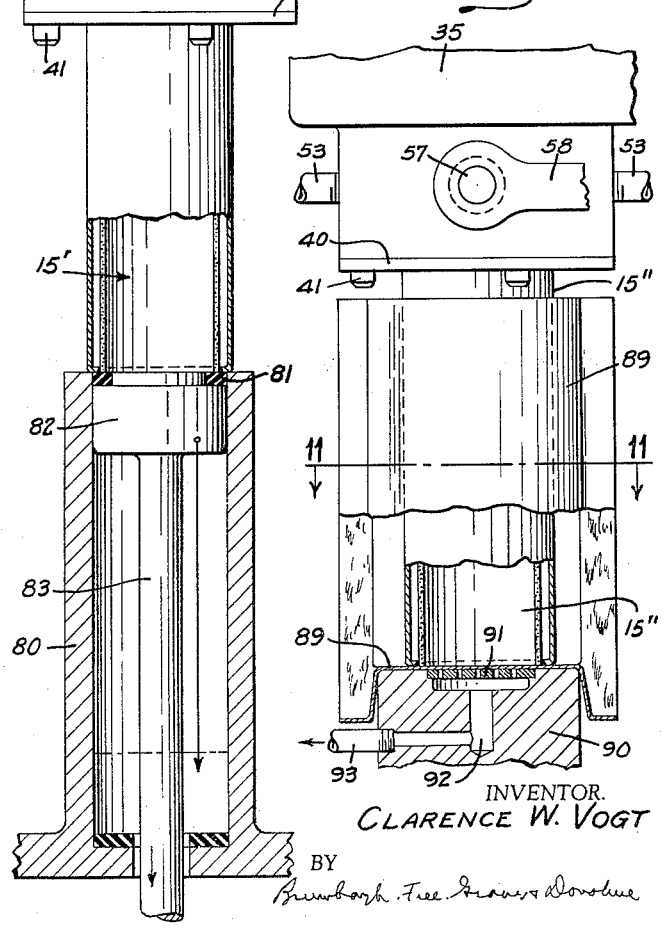
INVENTOR.
CLARENCE W. VOGT
BY
his ATTORNEYS United States Patent Office 3,045,717
Patented July 24, 1962

3,045,717
METHOD AND APPARATUS FOR PREPARING MEASURED CHARGES OF MATERIAL AND DISPENSING THEM INTO CAVITIES
Clarence W. Vogt, Weston, Conn.
(Rte. 4, Westport, Conn.)
Filed Aug. 29, 1958, Ser. No. 758,068
17 Claims. (Cl. 141—12)

This invention relates to methods and apparatuses for preparing measured quantities or charges of flowable solid materials and it relates particularly to methods and apparatuses for preparing and introducing accurately measured volumes and weights of such flowable solid materials into receptacles, such as cartons, boxes, bags, mold cavities or the like or directly into manufacturing equipment which requires accurately measured quantities of solid materials for operation.

In the preparation of measured quantities or charges or the packaging of flowable solid materials, it is generally recognized that the volume of a predetermined weight of a given flowable material may vary considerably, depending on the fineness of the product and the amount of interstitial air. Such variations in volume produce undesirable variations in the head space present in packages containing uniform weights of the material and create an unfavorable impression on the purchaser of the product.

In order to produce charges of a given flowable solid material of essentially uniform weight per unit of volume, it is necessary to reduce the amount of interstitial air to a minimum or to a substantially constant amount. In other words, the material must be compacted to a relatively dense condition in order to produce charges of essentially equal weights and volumes.

The problem of compacting the material when it is to be packaged in open mouth containers or charged into open mold cavities or apparatus requiring accurately measured quantities of material is complicated by the fact that high pressures must be used in order to compact the material to the degree required to obtain uniform weight per unit of volume thereby tending to blow the material out of the open containers and preventing filling of the containers with equal weights and volumes of materials. My copending U.S. application Serial No. 632,358, filed January 3, 1957, now Patent No. 2,879,809, dated March 31, 1959 discloses an apparatus and method by means of which charges of flowable solid materials of uniform volume and weight can be produced for filling into open mouth containers of various types. The present invention relates to improvements in the apparatus and methods disclosed in Patent No. 2,879,809.

More particularly, the present invention relates to methods and apparatuses for filling containers or preparing measured charges of flowable solid materials in which the materials are forced by gas under super-atmospheric pressure into a measuring chamber from which the gas is vented to enable the material to be compacted therein, the measured charge of material then being discharged from the measuring chamber into a container, mold cavity or other device, a portion of which serves as a closure for the measuring chamber during filling of the measuring chamber.

Inasmuch as the container or other device into which the measured charge is to be received serves as a closure for the measuring chamber, the device is considerably simplified and a more effective means is provided for venting or discharging air from the measuring chamber and filling the container and blanketing the flowable solid material with an inert gas in order to protect and preserve the product.

For a better understanding of the present invention reference may be had to the accompanying drawing in which:

FIG. 1 is a view partially in side elevation and partially in vertical section of a typical apparatus embodying the present invention;

FIG. 2 is a view in section taken on line 2—2 of FIG. 1;

FIG. 3 is a view in cross section taken on line 3—3 of FIG. 1;

FIG. 4 is a view in cross section taken on line 4—4 of FIG. 1;

FIG. 5 is a view in cross section taken on line 5—5 of FIG. 1;

FIG. 6 is a view in cross section taken on line 6—6 of FIG. 1;

FIG. 7 is a view in cross section taken on line 7—7 of FIG. 1;

FIG. 8 is a view partially in side elevation and partially in vertical section illustrating the position of the container during discharge of a measured quantity of material from the meausring chamber of the apparatus;

FIG. 9 is a view in side elevation and partially in vertical section of a portion of the apparatus illustrating the charging of a mold with material by means of the apparatus according to the present invention;

FIG. 10 is a view in side elevation and partially in section of a portion of the apparatus illustrating the filling of a flexible container or bag; and FIG. 11 is a view in cross section taken on line 11—11 of FIG. 10.

The apparatus illustrated in FIGS. 1 to 8 of the drawing is shown as being used for filling a can or carton 10 having rigid or semirigid walls. As illustrated, the apparatus includes a hopper 11 from which a flowable solid material can be fed through a ball-type valve 12 of the type disclosed in my copending applications Serial Nos. 620,531, now Patent No. 2,985,340, dated May 23, 1961 and 713,887, filed November 5, 1956, and February 7, 1958, respectively, into a magazine 13 from which the material may be blown by means of air or other gas, admitted through a solenoid valve 14, into a measuring chamber 15 where a unit or charge of controlled volume and density is produced.

As shown in FIG. 1, the casing of the valve mechanism 12 carries the hopper 11 and is mounted on a supporting plate or frame 16. A discharge port in the bottom of the valve casing is in alignment with the open upper end of the section 17 of the magazine 13. The section 17 is generally cylindrical in cross section and has a flange 18 abutting against the lower portion of the frame 16, and is aligned with the bottom opening in the casing of valve 12 by means of a rim 19 at its upper end.

A lower magazine section 20 of the magazine 13 is connected to the lower end of the section 17 by means of screws 21 passing through peripheral flanges 23 and 24 on the adjacent ends of magazine sections 17 and 20.

Within the magazine section 17 is a sleeve 25 of porous material, such as porous sintered metal, through which gas can flow to lubricate the inner surface of the sleeve and prevent material from clinging to it. The porosity of the sleeve 25 is such that the flowable solid material being charged into the magazine 13 cannot escape through the sleeve 25.

The upper end of the sleeve 25 abuts a shoulder 26 near the upper end of magazine section 17 while the lower end of the sleeve is provided with a flange 27 which is engaged in a groove or recess 28 in the lower end of the section 17.

A resilient liner 29 is mounted within the magazine section 20. The liner 29 may be formed of natural or synthetic rubber or a rubber or plastic impregnated fabric so that it is impermeable to the flow of gas therethrough. A rim 30 on the upper end of the liner 29 is received in a groove 31 in the flange 24 and is clamped against the flange 28 on the porous sleeve 25 and between the flanges 23 and 24. A plurality of passageways 32, 33 and 34 (FIGS. 1 and 6) are formed in the adjacent ends of the housing portions 17 and 20 so that pressures on opposite sides of the porous sleeve and the impermeable liner 29 can be equalized.

The lower end of the liner 29 is clamped between the lower end of the housing 20 and a cup-shaped retainer 35 (FIG. 1) secured to the lower end of the housing 20. A series of inclined screws 36 in the retainer engage a conical or tapered outer surface 37 on the lower end of the section 20 to hold the retainer detachably on the magazine 13.

At the lower end of the retainer 35 is mounted the measuring chamber 15. As illustrated in FIGS. 1 and 2, the measuring chamber includes an outer shell 38 of impervious metal which is welded to a flange 39 clamped against the lower end of the retainer 35 by means of a clamping ring 40 secured by means of screws 41 to the retainer 35. A sealing gasket 42 may be interposed between the recessed shoulder 43 in the retainer and the flange 39. Mounted within the sleeve 38 is a sleeve 44, all or a major portion of which is formed of rigid porous material, such as, for example, porous sintered metal. The sleeve 44 is of inverted cup shape and has its lower open end 45 welded to the inturned flange 46 at the lower end of the shell 38. The upper end of the liner 44 is closed except for a central aperture 47 and it also is welded to the inwardly bent tabs 48 at the upper end of the shell 38. The side wall of the liner 44 preferably is of lower permeability than the upper end of the liner, for a purpose to be described. Openings 49 between the tabs 48 communicate with an annular recess 50 in the lower end of the retainer 35, this recess communicating by means of passages 51 and 52 with one or more pipes 53 (FIGS. 1 and 3).

The passage 47 in the porous liner also communicates with an outlet 55 in the retainer 35 substantially coaxial with the recess 50 and communicating with a funnel-like or downwardly converging recess 56 in the upper end of the retainer which forms the bottom of the magazine 13. A rotary valve member 57 or its equivalent is mounted in the retainer 35 between the passage 55 and the recess 56 to control the flow of material from the magazine 13 to the measuring chamber 15. An operating arm 58 is fixed to the end of the valve member 57 and is oscillated by a solenoid or mechanically by means of a cam or crank, as desired.

As shown in FIG. 3, the pipes or conduits 53 are connected to each other and to a rotary valve 59 by means of a T 60. The valve 59 enables the pipes 53 to be connected to atmosphere, or a vacuum pump, for example, by means of the pipe 61 in the position shown in FIG. 3 or to a source of gas under pressure by means of the pipe 62.

Similarly, the space between the porous and flexible liners 25 and 29 and the walls of the magazine sections 17 and 20 is connected by means of pipes 63 and a T 64 to the valve 65 which selectively connects the space to a vacuum pump through the pipe 66 or to a source of gas under pressure through the pipe 67, such as, for example, the line between the solenoid valve 14 and the control valve 12, as shown in FIG. 1.

The resilient liner 29 is vibrated or flexed to agitate the solid material in the magazine 13 by means of a yoke 68 extending around the housing section 20 and carrying a pair of aligned rods 69 and 70 having enlarged heads or knobs 71 and 72 at their inner end which engage the liner at diametrically spaced points. The spacing between the knobs 71 and 72 is such that one or both sides of the liner 29 is deflected or displaced somewhat in any position of the yoke as shown in FIG. 5. The walls of the housing section 20 are provided with recesses 73 and 74 into which the knobs are retracted alternately as the yoke is reciprocated by means of an air motor 75 or its equivalent connected to the yoke 68 by means of the coupling 76. In practice, the motor 75 operates at a relatively slow rate, that is, on the order of 100 to 200 cycles per minute.

The rocking of the yoke 68 about the axes of the rods is prevented by the guide pin 77 on the housing section 20 which is slidably received in a hole 68a on the upwardly extending lug 68b on the yoke 68 as shown in FIGS. 1 and 7. The liner 29 and the plunger system described serve to dislodge the material from the sides of the magazine and push it toward the center of the magazine thereby preventing channelling of the flowable solid material during a blowing operation.

As illustrated in FIGS. 1 and 8, the container 10, such as a can or a carton, for receiving a measured charge of material is carried by a vertically reciprocating platform 78 so that the container is engaged telescopically over the measuring chamber 15 with the bottom of the container 10 engaging the end of the shell 38 and sealing the lower end of the measuring chamber.

In a typical operation and with the elements of the apparatus in the relations shown in FIGS. 1 to 7, the magazine is at least partially full of flowable solid material which has been introduced from the hopper 11 through the valve 12 into the magazine 13. When the valve 12 is closed to prevent further flow of material from the hopper to the magazine, air or other gas under a pressure several times that of the atmosphere, for example 40 to 100 p.s.i.g., is introduced by means of the solenoid valve 14 through the valve 12 into the magazine against the upper surface of the flowable material within the porous sleeve 25 and resilient liner 29 in the magazine 13. The gas pressure on the surface of the material forces it through the open valve 57, passages 55 and 47 into the porous liner 44 of measuring chamber 15. Inasmuch as the liner 44 is porous, interstitial gas in the flowable material is displaced and is vented through the pipes 53 and the valve 59 to atmosphere or to a vacuum pump connected to pipe 61. As a result, the material is compacted to a high density in the measuring chamber and due to elimination of a major portion of the interstitial air, charges of essentially equal weights can be introduced successively into the measuring chamber. Escape of the flowable material through the lower end of the measuring chamber is precluded by the bottom of the container 10 so that a dense block of material is formed. At the conclusion of the blowing operation, valve 57 is closed, solenoid valve 14 is actuated to vent gas from the magazine 13 and the valve 65 is moved to connect the space surrounding the porous and resilient liners 25 and 29 of the magazine to a vacuum pump to reduce the pressure in the magazine 13. A suitable check valve may be provided in the vent of the solenoid valve 14 to prevent backflow of air therethrough as disclosed more particularly in my application Serial No. 713,887. The valve 12 is actuated to connect the magazine to the hopper 11 so that an additional charge of material is introduced into the magazine from the hopper by gravity and by the reduced pressure in the magazine. At about the same time, the platform 78 is lowered to the position shown in FIG. 8 and the valve 59 is actuated to connect the pipes 53 to a source of gas under pressure through the pipe 62. The gas may be air, or, if desired, an inert gas such as nitrogen or carbon dioxide. Flow of gas inwardly through the upper end of the porous liner 44 of the measuring chamber 15 dislodges the measured charge of material therein and the flow of gas through the less permeable sides lubricates the surface of the liner 44 without disintegrating the charge so that it slides downwardly as a unit into the lowered container 10 as illustrated in dotted lines in FIG. 8. A relatively low gas pressure in the order of 2 p.s.i.g. is sufficient to dislodge the charge without blowing it apart or blowing any of it from the container 10. With many materials, the charge of material is form retaining whereas charges of other types of materials, such as flour, may break up as it is discharged from the measuring chamber 15 and will fill or partially fill the container. Shaking the container after it has been closed fluffs and reduces the density of the material so that the container is filled completely or substantially so.

During the blowing operation and during the recharging operation, the flexible liner 29 is moved back and forth to make certain that no voids form in the material in the magazine and to prevent the formation of channels in the material through which gas can flow directly to the measuring chamber. Likewise, during the succeeding blowing operation, the valve 65 admits gas under pressure through the porous liner 25 to clean it and dislodge any material clinging to the liner 25. Equalization of the gas pressure inside and outside the liner 29 by means of the passages 32 to 34 avoids overstressing and possible rupturing of the liner 29.

As shown in FIGS. 1 to 8, the bottom of the container 10 serves as a closure for the measuring chamber during a blowing operation, but such an arrangement is not essential to the operation of the system. For example, as shown in FIG. 9, a mold 80 may be mounted for movement into and out of alignment with the lower end of the measuring chamber 15'. Slidably mounted within the mold 80 is a plunger 82 which is raised by means of a piston rod 83 thereon to about the plane of the open end of the measuring chamber 15'. The upper end of the piston is provided with a gasket 81 of rubber or the like for sealing engagement with the lower end of the shell 38' of the measuring chamber 15'. The plunger is maintained in this position during a measuring and filling operation to close the bottom of the measuring chamber. Thereafter, the plunger 82 is lowered to the dotted line position shown in FIG. 9 to enable the mold to receive the measured charge of material from the measuring chamber 15'. The mold is then moved to another position where the charge of material therein is ejected by the plunger or may be further shaped and molded to form a finished product.

As shown in FIG. 10, a flexible or collapsible bag 89 may be filled by mounting it on a support 90 and telescoping it over the measuring chamber 15" so that the bottom of the bag 89 closes the lower end of the measuring chamber. The bag is filled by lowering of the support 90 as the measured charge is discharged from the measuring chamber. Downward movement of the bag 89 is assured by the suction applied through the perforated or porous plate 91 by means of a vacuum pump connected to the passage 92 behind the plate by means of the pipe 93.

In filling the containers, the volume of the measuring chamber may be related to the capacity of the container to control the degree of fluffing of the material after the container is closed. The container may be sufficiently larger than the measured charge to enable the container to be closed and sealed and when the material is fluffed therein it will completely fill the container and keep it filled despite the normal tendency of finely divided materials to settle in transit and during handling. Of course, the container can be made proportionately larger, if head space is desired. The bag 89, for example, is of somewhat greater cross sectional area than the cross section of the measuring chamber so that when the measured charge is dropped into the bag and reshaped to fill the cross section of the bag, sufficient space is left at the top of the bag to enable it to be closed and sealed without appreciable head space.

The term "flowable solid material" as used herein means material in the form of powder, grains, granules, particles, kernels or the like of uniform or varying size, the size being such as to permit the material to be blown by gas pressure through orifices of suitable size for filling containers, cavities or other receptacles.

From the foregoing description, it will be apparent that the apparatus described herein and the method of filling containers is adaptable to the filling of many different types of receptacles, containers or the like and generally for the preparation of charges of material of a predetermined volume and uniform weight.

Inasmuch as the material is in a relatively dense form, smaller containers may be used for packaging charges of material of a given weight than was possible heretofore but, if for advertising, merchandizing or other purposes, a larger container is required without an unusually large head space, it will be understood that the material after having been measured and filled into the containers can be dispersed or fluffed by agitating or knocking the container thereby to restore the interstitial gases and expand its volume. In any event, containers filled in accordance with the present invention have uniform weights of material therein within very close tolerances.

The invention provides a simple practical solution to the problem of eliminating slack filling or excluding head space heretofore required for auger, gravity, vacuum or pre-weighed charge filling of containers. With pre-measured volumetric charges, head space cannot be eliminated when the charge is dropped or drawn into containers since, due to variation of particle sizes and relations, some of the materials frequently will overflow the container unless the containers are jarred or jolted during and after the filling operation. Collars must be mounted above the container tops during the jolting to prevent such overflow.

Mounting and removal of the collars and the jarring of the containers until the level of the material has dropped sufficiently below the tops of the containers to permit the clean closing of the tops of the containers is impractical in commercial packaging.

Inasmuch as apparatuses and methods embodying the invention are susceptible to considerable modification, it will be understood that the forms of the invention described herein should be considered as illustrative.

I claim:

1. A method of preparing and filling measured charges of material into a cavity of a member comprising forcing flowable solid material by gas under superatmospheric pressure into a measuring chamber having a discharge outlet, closing the discharge outlet with a member containing a cavity having a side wall and a bottom to receive a charge of said material, venting gas from said chamber to compact the charge of material therein, moving said members relative to said chamber to open said outlet and then ejecting the compacted charge of material from said chamber into said cavity in said member to fill said cavity at least partially.

2. A method of preparing and filling measured charges of material into a cavity of a member comprising forcing flowable solid material by gas under superatmospheric pressure into a measuring chamber having a discharge outlet, placing against said outlet to close it, a member containing a cavity having a side wall and a bottom, venting gas from said chamber to enable said flowable material to fill the chamber, discontinuing forcing of said flowable material and moving said member away from said outlet to open it and to dispose the cavity therein in a position to receive said material from said chamber, and ejecting said material from said chamber into said cavity to fill said cavity at least partially.

3. The method set forth in claim 2 in which said ejecting steps comprises introducing gas into said chamber adjacent to at least the upper end of said chamber.

4. A method of preparing and filling measured charges of flowable solid material into a cavity of a member comprising applying gas at superatmospheric pressure to a column of said flowable material to force said material through an orifice into a measuring chamber having an outlet while agitating said column to prevent channelling of gas therethrough, closing the outlet of said chamber and venting gas from said chamber to fill said chamber with said flowable material and compact it therein, discontinuing blowing of said material, uncovering said outlet and eejcting said material from said chamber into a cavity having a side wall and a bottom to fill said cavity at least partially.

5. The method set forth in claim 4 in which said ejecting step comprises introducing gas under pressure into said chamber around the material therein.

6. An apparatus for preparing measured charges of a flowable solid material comprising a magazine for receiving said flowable solid material, said magazine having an inlet for receiving said material and an outlet for discharging said material therefrom, means for opening and closing said inlet and said outlet, means for introducing gas at several times atmospheric pressure into said magazine to discharge said material through said outlet, a measuring chamber communicating with said outlet and having an open end, means for closing said open end, porous means in said chamber for venting gas from said chamber while retaining said material therein, means for introducing gas under pressure into said chamber through said porous walls to discharge said material from said chamber and means for agitating said material in said magazine to prevent channelling of the material being discharged through said outlet into said chamber.

7. The apparatus set forth in claim 6 in which the means for agitating said material in said magazine comprises a flexible liner in said magazine adjacent to said outlet and means for moving said liner intermittently relative to said magazine.

8. An apparatus for preparing measured charges of a flowable solid material comprising a magazine for receiving said flowable solid material, said magazine having an inlet for receiving said material and an outlet for discharging said material therefrom, means for introducing gas at several times atmospheric pressure into said magazine to discharge said material through said outlet, a measuring chamber communicating with said outlet and having an open end, means for closing said open end, porous means in said chamber for venting gas from said chamber while retaining said material therein, a flexible liner in said magazine adjacent to said outlet, means for moving said liner intermittently relative to said magazine, a porous wall portion in said magazine adjacent to said liner and means for venting gas from and introducing gas into said magazine through said porous wall portion.

9. An apparatus for preparing measured charges of a flowable solid material comprising a magazine for receiving said solid material, said magazine having an outlet, means for introducing gas under pressure into said magazine to discharge said solid material through said outlet, a measuring member containing a chamber having an inlet communicating with said magazine outlet and an open end, a porous wall portion in said measuring member for venting gas from said chamber, means supporting a receiving member having a cavity therein adjacent to said open end, said receiving member having a portion movable to a first position to cover said open end of said chamber and to a second position in which said cavity communicates with said open end, and means for venting gas from and introducing gas into said chamber through said porous wall portion to enable filling and emptying of said chamber.

10. The apparatus set forth in claim 9 in which said receiving member is a container telescopically receiving said measuring member with its bottom closing the open end of said chamber in said first position, said material being discharged into said container when the latter is in said second position.

11. The apparatus set forth in claim 9 in which said receiving member is a flexible bag telescopically receiving said measuring member and with its bottom closing said open end of said chamber in said first position, said material being discharged into said container when the latter is in said second position.

12. The apparatus set forth in claim 9 in which said receiving member is a mold member having a movable ejecting plunger therein closing said open end of said chamber in said first position and retractable into said mold member in said second position, said material being discharged into said mold member when the plunger is in said second position.

13. An apparatus for preparing measured charges of a flowable solid material comprising a magazine for receiving said flowable solid material, said magazine having an inlet for receiving said material and an outlet for discharging said material therefrom, means for opening and closing said inlet and said outlet, means for introducing gas at several times atmospheric pressure into said magazine to discharge said material through said outlet, a flexible liner in said magazine adjacent to said outlet and plungers mounted in opposite sides of said magazine for reciprocating movement relative to said magazine to flex said liner, means connecting said plungers for movement together in the same direction and means for reciprocating said plungers to flex and displace said liner relative to said magazine.

14. A method of preparing measured charges of material comprising forcing flowable solid material by gas under superatmospheric pressure into a measuring chamber having a discharge outlet, closing said outlet with a removable member, venting gas from said measuring chamber while retaining in the chamber the material being forced into it to compact the material therein and, thereafter, moving said removable member away from said outlet to open said outlet and ejecting the compacted charge of material from said chamber while supporting said compacted charge on said removable member.

15. Apparatus for filling receptacles comprising a magazine having an inlet for supplying material to said magazine and a floor having a discharge passageway therein for said material, means for opening and closing said inlet, a resilient lining in said magazine, elements mounted at opposite sides of said magazine for engaging the outside of said lining for pushing opposite sides of said lining inwardly, means for actuating said elements for alternately pushing said opposite sides inwardly and means to supply gas under pressure to said magazine to force material therein through said discharge passageway into said receptacle.

16. A method of supplying measured charges of material comprising forcing flowable solid material by gas under superatmospheric pressure into a porous measuring chamber having a discharge outlet, closing said discharge outlet with a portion of a removable member containing a cavity having a side wall and a bottom to receive the material, moving said portion of said removable member away from said outlet to open it while maintaining said cavity in alignment with said outlet and ejecting said material from said chamber into said cavity while retaining said charge in engagement with the bottom of said cavity of the removable member to fill said cavity at least partially.

17. A method of supplying measured charges of material comprising forcing flowable solid material by gas under superatmospheric pressure into a porous measuring chamber having a discharge outlet in its bottom, closing said outlet with the bottom of a cavity in a removable member for receiving the material, moving said bottom of said cavity away from said outlet to open it while maintaining said cavity in alignment with said outlet and ejecting said material from said chamber into said cavity while retaining sad charge in engagement with the bottom of said cavity of the removable member to fill said cavity at least partially.

References Cited in the file of this patent
UNITED STATES PATENTS

| | | |
|---|---|---|
| 2,380,884 | Von Stoeser et al. | July 31, 1945 |
| 2,381,802 | Booth | Aug. 7, 1945 |
| 2,611,938 | Hansberg | Sept. 30, 1952 |
| 2,690,865 | Fischer | Oct. 5, 1954 |
| 2,792,262 | Hathorn | May 14, 1957 |
| 2,879,809 | Voight | Mar. 31, 1959 |